Nov. 15, 1966   H. BRENDES ET AL   3,286,254
CIRCUIT ARRANGEMENT
Filed Nov. 13, 1964                    5 Sheets-Sheet 1
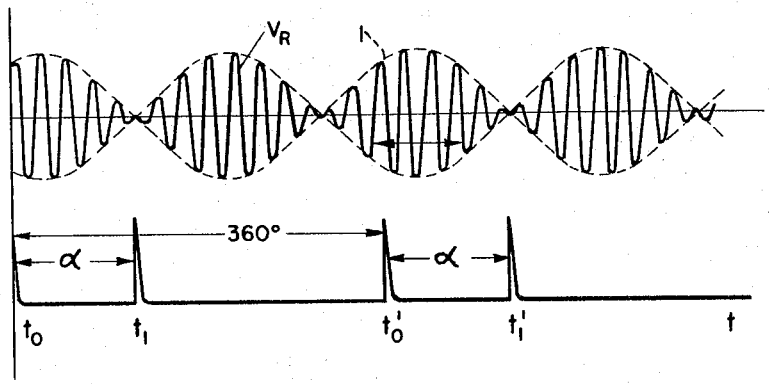
FIG.1.
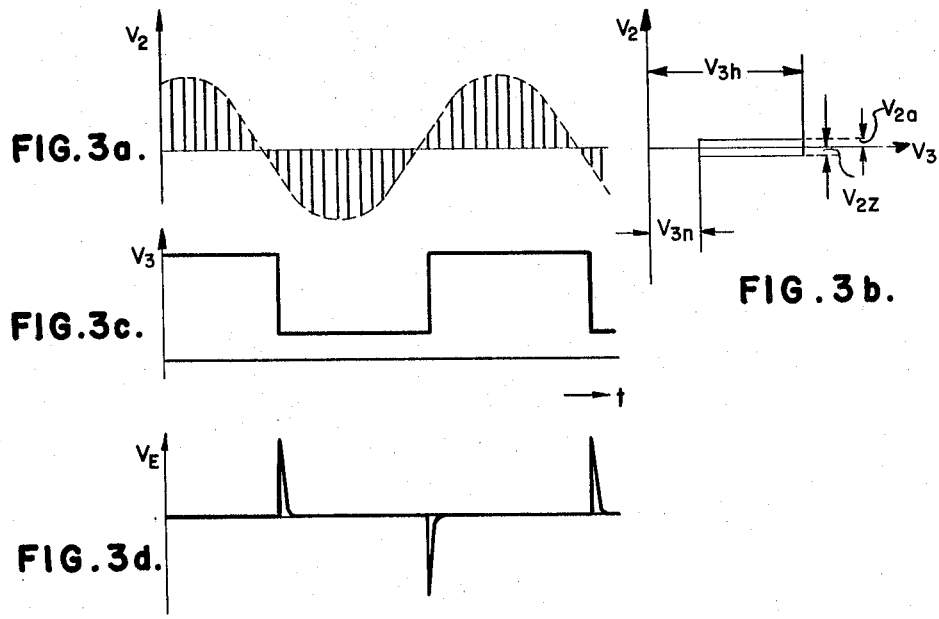
FIG.3a.
FIG.3b.
FIG.3c.
FIG.3d.
INVENTORS
Horst Brendes &
Jörg Fuchs
BY Spencer & Kaye
ATTORNEYS

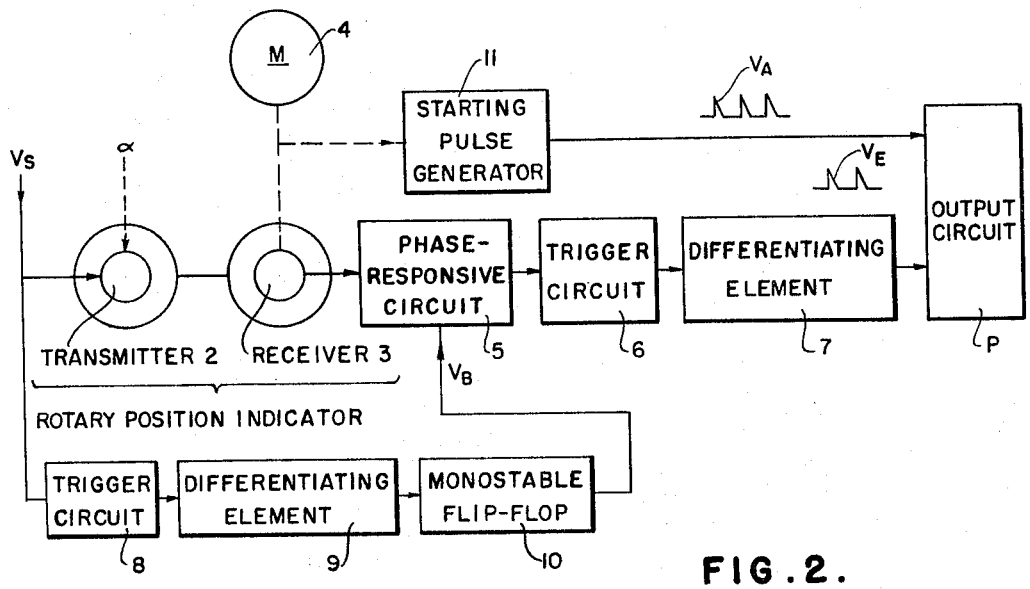

INVENTORS
Horst Brendes &
Jörg Fuchs

BY Spencer & Kaye
ATTORNEYS

United States Patent Office 3,286,254
Patented Nov. 15, 1966

3,286,254
CIRCUIT ARRANGEMENT
Horst Brendes, Sandhausen, and Jörg Fuchs, Herrenberg, Germany, assignors to Teldix Luftfahrt-Ausrüstungs G.m.b.H., Heidelberg-Wieblingen, Germany
Filed Nov. 13, 1964, Ser. No. 411,070
Claims priority, application Germany, Nov. 25, 1963, T 25,119
23 Claims. (Cl. 340—347)

The present invention relates to an apparatus for determining an angular position digitally.

The present trend toward the use of digital computers requires that simple and reliable equipment be provided for converting analog quantities into digital form, and the present invention relates to the case where the quantity involved is an angle. The present invention is, moreover, based on the fact that the angle is to be transmitted by means of rotary indicators, and that the digital signal is to be derived from the output end of the electric transmission. Thus, the instant invention relates to an arrangement for determining an angular position, this arrangement incorporating, as its basic component, a rotary position indicator which itself includes a transmitter and a receiver.

One way of measuring an angular position of, for example, a shaft, digitally is to equip the shaft with a raster disc. This disc may, for example, be provided with radial slits which are arranged in a plurality of concentric annular regions, the width of which slits is equal to the width of the webs remaining between them. The width of the slits and webs in the individual annular region will differ from each other and be equal to $180°/n$, where $n$ is the order of the particular annular region. These slits are scanned photoelectrically and the outputs of the scanning means are used to control binary elements. If the accuracy of the system is to be so great as to have a very small error (of the order of $\pm 0.1\%$), the number of slits and webs has to be so large as to present considerable practical difficulties, especially when the diameter of the disc must—as it usually has to be— kept within reasonable limits.

Yet another drawback of a system relying on the photoelectric scanning of raster discs is that the light has to sharply be focussed.

Another drawback is encountered in the case of multiple systems in which the positions of a plurality of angular position indicators has to be read out simultaneously, as, for example, in the case of certain aerial navigation equipment, where no provision is made, in conventional equipment, to allow the simultaneous use of individual electrical components, or groups of components, of the several information channels.

It is therefore, the primary object of the present invention to provide an arrangement, especially an arrangement incorporating mainly electrical circuit components, by means of which the angular position of an element can be determined, which arrangement overcomes the above-mentioned drawbacks of the prior art.

With this primary object in view, the present invention resides, mainly, in an arrangement which comprises a rotary angle indicator incorporating a transmitter and a receiver each having a stator and a rotor, the two stators being electrically connected to each other and the rotor of the transmitter being adjustable to the angular position to be determined. Means are provided for applying an alternating voltage to the rotor of the transmitter, and a drive motor is mechanically coupled to the rotor of the receiver for rotating the same, in consequence of which the voltage across the receiver rotor is sinusoidally modulated and undergoes a phase shift when the transmitter and receiver rotors assume the same angular position. Also provided are means for producing a starting pulse when the receiver rotor assumes a given angular reference position, and phase-responsive means which are connected to the receiver rotor for producing an end pulse when the receiver rotor voltage undergoes a phase shift. The duration of the time interval between the starting and end pulses is then determined, which, in turn, produces a measurement of the angular position of the transmitter rotor that is readily susceptible to digital evaluation. For example, the time interval can be measured digitally by letting the starting and end pulse start and stop a counter to which counting pulses are applied, so that the count of the counter will be a digital evaluation of the time interval in question, and hence of the angle to which the transmitter rotor was set.

Additional objects and advantages of the present invention will become apparent upon consideration of the following description when taken in conjunction with the accompanying drawings in which:

FIGURE 1 is a graph showing the relationship between the modulated rotor voltage and the starting and end pulses.

FIGURE 2 is a block diagram of a rotary position indicator arrangement according to the present invention.

FIGURES 3a, 3b, 3c and 3d are graphs showing how the end pulses are derived from the rotor voltage.

FIGURE 4a is a graph showing a critical portion of the graph of FIGURE 1, on an enlarged scale, and additionally depicts the 90°-fundamental or so-called quadrature of the null voltage, while

FIGURE 6 is a block diagram of a rotary position indicator arrangement wherein a plurality of angles can be measured simultaneously.

FIGURE 7 is a block diagram of an arrangement in which fluctuations in the speed at which the receiver rotor is rotated are compensated for.

Figure 4A:
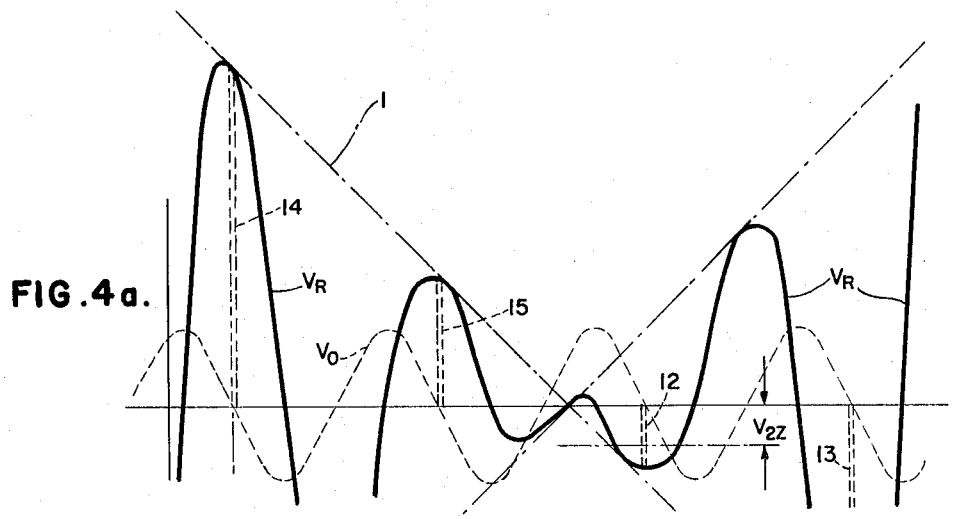

Before proceeding with a detailed description of the drawings, a brief introductory explanation is thought to be in order.

It will be appreciated that the amplitude of the voltage across the braked rotor of the receiver of the rotary position indicator is dependent on the angular position of the rotor of the transmitter. The dependency is sinusoidal such that when the position is at the null point, the voltage is zero, this voltage reaching its maximum in the 90° position of the transmitter rotor and again dropping to zero at 180°. This is repeated between 180° and 360°, except that the phase of the wave is shifted by 180° with respect to the first-mentioned region of 0 to 180°. The same relationship prevails when the transmitter is standing still and the receiver is rotated, or when there is any other relative movement.

Starting with the assumption that the transmitter rotor, after having been positioned, is stationary and the receiver rotor rotates, the relationship can be expressed by considering the supply voltage $V_S$ of the indicator as being modulated by the rotational speed or angular frequency of the receiver rotor. This is shown in FIGURE 1 in which the rotor voltage itself is shown at $V_R$, the envelope 1 representing the angular frequency of the rotor. After each half wave of the envelope 1, the rotor voltage $V_R$ undergoes a phase change of 180°. Here it should be noted that when the transmitter generator is angularly displaced, the envelope 1 moves along the time axis; for example, one complete revolution of the transmitter rotor will displace the envelope along the time axis an amount which is represented by the 360° indicated in FIGURE 1, this being one period.

Shown below the modulated oscillation are pulses, the same being shown along the same time scale as the oscillation. The pulses sent out at the instants $t_0$ and $t_0'$ will hereinafter be referred to as the starting pulses $V_A$. These pulses are derived, by suitable means to be described below, from the rotation of the receiver rotor or its drive means, and appear whenever the rotor goes through a given reference or null position. The pulses appearing at the instant $t_1$, $t_1'$, and so on, will hereinafter be referred to as end pulses $V_E$; these pulses are, in accordance with the present invention produced every other time the envelope 1 goes through zero.

Consequently, when the envelope moves along the time axis by an input angle $\alpha$, so will the end pulses. Thus, the time interval $t_1-t_0$, $t_1-t_0'$, and so on, are, in effect, precise measurements of the angle $\alpha$.

FIGURE 2, which is a block diagram of a rotary position indicator arrangement according to the instant invention, shows the transmitter 2 and the receiver 3, these two components being, as stated above, a pair of components which together constitute a rotary position indicator of the type used in the present invention. The outer circle of each of the components 2, 3, represents the respective stator and the inner circle the respective rotor. The connections shown in solid lines represent electrical connections while the dashed lines represent mechanical connections.

The transmitter rotor has applied to it the supply voltage $V_S$, and is made to assume an angular position which corresponds to the angle $\alpha$ to be measured. The stators of components 2, 3, are connected to each other via a multiple lead having three or four lines. The receiver rotor 3 is mechanically connected to a motor 4 and electrically to a phase-critical or so-called phase-responsive circuit 5. This circuit 5 is controlled by means of reference pulses which are derived from the supply voltage $V_S$, by means of the circuit components 8, 9, 10, approximately at the instant at which each positive half-wave is at a maximum. Component 8 is a voltage-sensitive trigger circuit, such as a so-called Schmitt trigger circuit, while component 9 is a differentiating element and component 10 is a monostable multivibrator or so-called monostable flip-flop. The phase-responsive circuit 5 puts out, via a further Schmitt trigger circuit 6 and a further differentiating element 7, the end pulses $V_E$. The starting pulses $V_A$ are derived, for example, by means of a photoelectric circuit 11 which puts out a signal whenever the receiver rotor passes through a given reference or position. This will be explained more fully below, in connection with FIGURE 5.

Thus, FIGURE 2 shows how the starting and end pulses $V_A$, $V_E$, are obtained; the circuit by means of which the time interval between corresponding $V_A$ and $V_E$ pulses is measured and processed is shown schematically at P and contains digitally operating devices, such as means for producing counting pulses, counters, and the like, as will be explained below.

As stated above, the end pulses $V_E$ are derived from the rotor voltage $V_R$, whenever the same undergoes a phase shift, by means of the phase-responsive circuit 5. The phase-responsive circuit is a circuit which, when a D.C. voltage of given polarity is applied, will pass current in both directions but which closes, i.e., blocks the flow of current, when the polarity of the D.C. voltage changes. The D.C. voltages of given polarity are, in the circuit of the present invention, the reference pulses $V_B$ which serve to render the current transmitting path of the phase-responsive circuit 5 temporarily conductive for a short time, throughout regular time intervals whose duration corresponds to that of the duration of the period of the rotor voltage $V_R$. Thus, during the time intervals when the circuit 5 is open, the rotor voltage is passed in the form of pulses, irrespective of whether this rotor voltage happens to be positive or negative. There will thus be produced the pulses $V_2$, shown in FIGURE 3a, whose amplitude will be approximately equal to that of the envelope 1 which, however, due to the phase change of the rotor voltage, change their polarity every time after the envelope has passed through zero.

The voltage $V_2$ put out by the circuit 5 is applied to the trigger 6, whose output voltage $V_3$ is dependent on its input voltage $V_2$, as shown in FIGURE 3b. If the input voltage exceeds a positive threshold $V_{2a}$ the output of the trigger circuit 6 changes over from a low output voltage $V_{3n}$ to a high output voltage $V_{3h}$. Conversely, the trigger circuit 6 switches over from the high output voltage to the low output voltage when the input voltage exceeds a negative threshold $V_{2z}$. FIGURE 3c shows the output voltage $V_3$ of the trigger circuit 6 as a function of time. FIGURE 3d shows the effect of the differentiating element 7 which has applied to it, as its input voltage, the voltage $V_3$, so as to produce as its output voltage the series of positive and negative short pulses of which preferably the positive pulses are used and constitute the end pulses $V_E$. These are the pulses which appear, in FIGURE 1, at the instants $t_1$, $t_1'$.

Instead of using the short reference pulses $V_B$ for controlling the phase-responsive circuit 5, the supply voltage $V_S$ itself could be used directly as the control value. Indeed, the use of the supply voltage would appear to be more in keeping with present-day engineering techniques, but, while the use of the supply voltage directly is inherently possible, there will now be shown how the use of pulses—as described above—results in a more accurate angle measurement than does the use of the supply voltage.

At the outset, let it be understood that the null voltage occurs when the transmitter and receiver assume the same angular position. This null voltage is composed of a voltage which is of the same frequency as the supply voltage but is phase-shifted 90° with respect thereto, this being the so-called quadrature voltage, and of voltages of different harmonics of the fundamental frequency. Consequently, when the receiver occupies the 0° and 180° positions—these being the "null" positions of the envelope when the envelope passes through zero— the rotor voltage will not be precisely zero, but will only drop toward the null voltage. While the use of well-designed equipment allows this null voltage to be kept very small, it is not possible to bring it down to exactly zero. But of main concern is only the quadrature fundamental which, as the other harmonics, does not partake of the phase shift of the rotor voltage.

FIGURE 4a shows the rotor voltage $V_R$, on an enlarged scale, at the point where it undergoes the phase shift. The shape of the curve at this point is dependent on the angle $\alpha$. The quadrature fundamental of the null voltage is indicated at $V_0$. As is apparent from the explanation of FIGURE 3, it is desirable that at least one of the two thresholds of the trigger circuit 6 be set very small, in order that the desired end pulse will lie in the first, or at least in one of the first, periods of the rotor voltage following the phase shift. This, as will be explained more fully below, is determinative of the accuracy with which the angle is determined. FIGURE 4a also shows the threshold $V_{2z}$. Here it is still assumed that the circuit 5 is open during the two positive half waves of the rotor voltage on the left side of FIGURE 4a and during the negative half wave of the rotor voltage on the right side. It will thus be seen that, if the threshold $V_{2z}$ is as small as possible, as shown in FIGURE 4a, the negative half of the quadrature fundamental will be passed in the left half of FIGURE 4a and the positive half of this quadrature fundamental will be passed in the right half of FIGURE 4a. This would eliminate the phase-critical characteristic of the circuit, and the trigger circuit would continuously swing back and forth.

Therefore, it will be appreciated that the use of short pulses, which coincide with the instants at which the quadrature fundamental passes through zero and which control the phase-responsive circuit, effectively suppresses the adverse effect which would result if the supply voltage were used directly. Any residual adverse effect of the harmonics can be eliminated by suitable filtering.

Figure 4B:
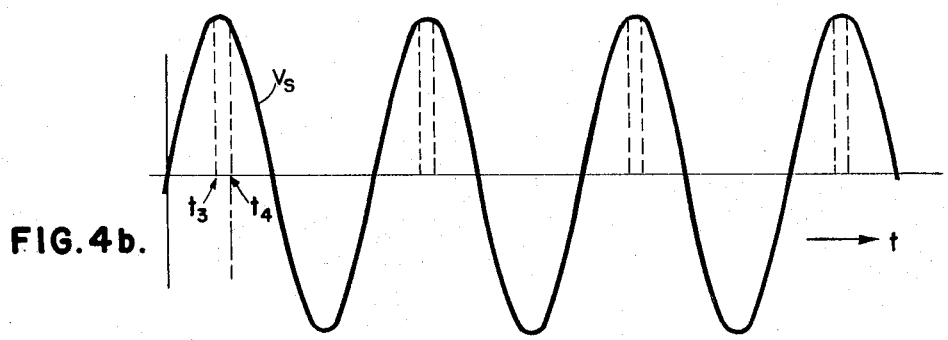
FIGURES 4b, 4c, 4d and 4e are graphs showing how reference pulses, used in the formation of the end pulses, are derived from the supply voltage.

The supply voltage $V_S$ is shown in FIGURE 4b. This supply voltage $V_S$, it will be noted, is somewhat phase-shifted with respect to the rotor voltage $V_R$. Such a phase shift will occur in any rotary position indicator of this type and may, for example be about 10°. The pulse to be derived must therefore not coincide with the point where $V_S$ is at a maximum but must occur shortly before or shortly thereafter. This can be achieved by applying the indicator supply voltage $V_S$ to a further Schmitt trigger circuit having a small hysteresis, such as is constituted by component 8. Such a trigger circuit puts out the rectangular wave form shown in FIGURE 4c. The threshold are then so set that the trigger circuit will switch over to the low voltage shortly before the positive maximum $V_S$ is reached, and will drop back again shortly after this maximum has been reached. This rectangular voltage is differentiated by means of the differentiating circuit 9 which produces the pulses shown in FIGURE 4d. The rising flanks of the positive pulses constitute the input signals for the monostable flip-flop 10 which puts out narrow rectangular pulses shown in FIGURE 4e, so that the pulses can be adjusted precisely to the instants at which the quadrature fundamental passes through zero. FIGURE 4a also shows how the phase-responsive circuit 5 cuts narrow pulses 12, 13, 14, 15, out of the rotor voltage under the controlling influence of the reference pulses. These pulses 12, 13, 14, 15, are shown, on a reduced scale, in FIGURE 3a.

Figure 5:
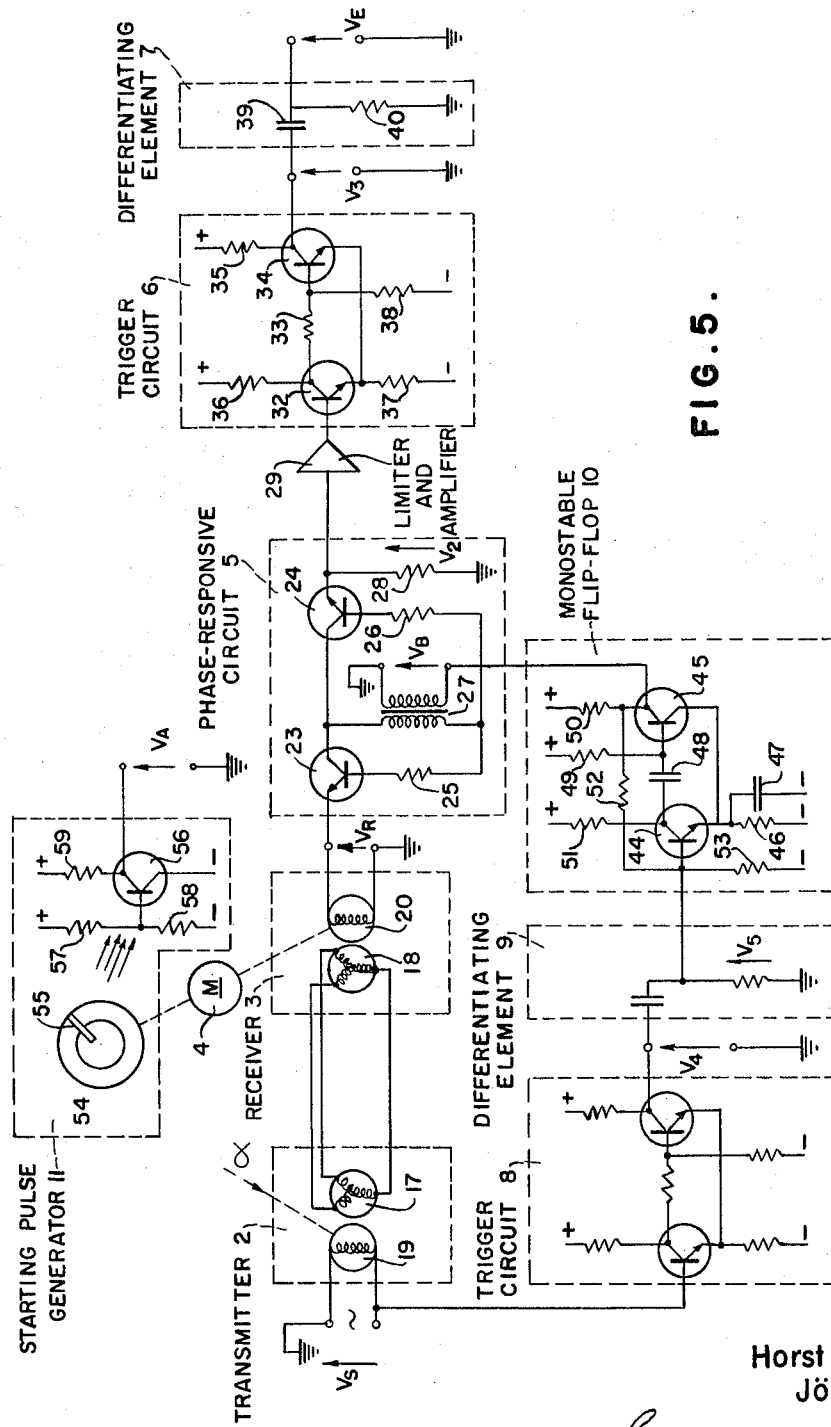
FIGURE 5 is a circuit diagram of the rotary position indicator arrangement shown, in block form, in FIGURE 2.

Referring now to FIGURE 5, which is a circuit diagram of a rotary angular position indicator arrangement in accordance with the present invention, there is once again shown the transmitter 2, the receiver 3 and the motor 4, as well as the components 5 through 11 that are depicted in block form in FIGURE 2.

The transmitter and receiver stators 17, 18, are connected to each other by means of three lines. The position of the transmitter rotor 19 is set, by positioning shaft 1, in accordance with the angle α, and has applied to its winding, one terminal of which is grounded, the indicator supply voltage $V_S$, this being an A.C. having a frequency of about 4 kilocycles. The rotor 20 of the receiver is mechanically coupled with the drive motor 4, which rotates the rotor 20 at a speed of about 60 r.p.m. The rotor voltage $V_R$, which is modulated with the drive frequency, appears across the winding of the rotor 20, one terminal of which is likewise grounded.

The phase-responsive circuit 5 comprises two transistors 23, 24. The bases of the two transistors are connected to each other via two serially connected resistors 25 and 26, while the collectors of the two transistors are connected directly to each other. Connected across the junction of the two collectors and the junction of the resistors 25, 26, is the secondary winding of a transformer 27. The primary winding of this transformer 27 has one grounded terminal, while the other terminal has applied to it the reference pulses $V_B$, one such pulse being applied for each positive half wave of the supply voltage $V_S$. The actual switching path of the circuit 5 runs from the winding of the receiver rotor via the emitter and collector of transistor 23 to the collector and finally the emitter of transistor 24. When this path is open, the rotor voltage appears across a resistor 28 which is connected across the emitter of transistor 24 and ground. The pulses $V_2$ shown in FIGURE 3a can thus be taken off from across the resistor 28.

Experience has shown that the collector-emitter cut-off voltages of the transistors 23 and 24, which appear as noise voltages within the circuit, should be as nearly as possible equal to each other so that they will just cancel each other. Otherwise, very small pulses $V_2$ which appear immediately after the phase shift will not be passed through.

Before the pulses $V_2$ are applied to the trigger circuit 6, it is best if they are first clipped, i.e., limited to a given amplitude, and then amplified. The means for this, namely, a limiter and amplifier, are well known per se and are shown symbolically at 29. The advantage of so limiting and then amplifying the pulses is that the first and smaller pulses, which, in the final analysis, are the most critical ones insofar as the accuracy of the system is concerned, will be properly amplified without unduly amplifying the subsequent larger pulses.

The trigger circuit 6 comprises a first transistor 32 whose base constitutes the input of the trigger circuit. The collector of transistor 32 is connected, via a resistor 33, to the base of a second transistor 34, from which is taken off the output voltage $V_3$, shown in FIGURE 3c. The collector of transistor 34 is connected to the positive terminal of a first D.C. voltage source, represented symbolically by the plus sign, via a resistor 35. The collector of transistor 32 is connected to the positive terminal of this D.C. voltage source via a further resistor 36. The emitters of the two transistors 32, 34, are connected to each other, and the junction of the two emitters is connected, via a resistor 37, to the negative terminal of a second D.C. voltage source, the same being shown symbolically by the minus sign. The negative terminal of the first-mentioned D.C. voltage source and the positive terminal of the second D.C. voltage source are grounded. The ends of the other leads depicted in FIGURE 5 and marked with plus and minus signs are connected to the two mentioned voltage sources. The base of transistor 34 is connected to the negative terminal of the second D.C. voltage source via a resistor 38.

The trigger circuit 6 operates as follows:

Under quiescent conditions, i.e., when no input voltage or a negative pulse $V_2$ is applied, the transistor 34 is in conductive state. The output voltage $V_3$ is therefore small. The voltage drop across resistor 37 renders the first transistor 32 wholly non-conductive, i.e., the transistor 32 is cut off. If, then, there is applied a positive voltage $V_2$ which exceeds the positive threshold $V_{2a}$, the transistor 32 begins to become conductive. This produces a voltage drop across resistor 36, which, via the voltage divider constituted by the resistors 33 and 38, applies a voltage to the base of transistor 34 to render the base non-conductive. Consequently, less current flows through resistor 35, transistor 34 and resistor 37. The base of transistor 32 thereby becomes even more positive with respect to its emitter, which accelerates the change of state of the trigger circuit. Since this change-over is limited only by the inherent reaction time of the transistors, which is very small indeed, the change-over is completed very quickly. In an analogous manner, the trigger circuit will fall back to its other state when the negative threshold is exceeded.

The differentiating element 7 comprises a series-circuit constituted by a capacitor 39 and a resistor 40, one terminal of the latter being grounded. A charging current will flow while the voltage $V_3$ changes, which produces a voltage drop across resistor 40. This voltage is taken off across resistor 40 and will be in the form of very pointed, so-called needle-shaped pulses of alternating polarity. The pulses of one polarity, i.e., either the positive or the negative pulses, preferably the former, represent the ultimate end pulses $V_E$ according to the present invention.

Referring now to the circuitry for producing the reference pulses $V_B$, the same is constituted by the trigger circuit 8, the differentiating element 9, and the flip-flop

Figure 4C:
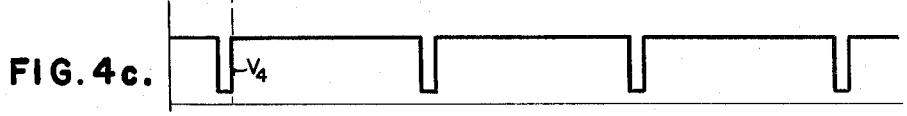
Figure 4D:
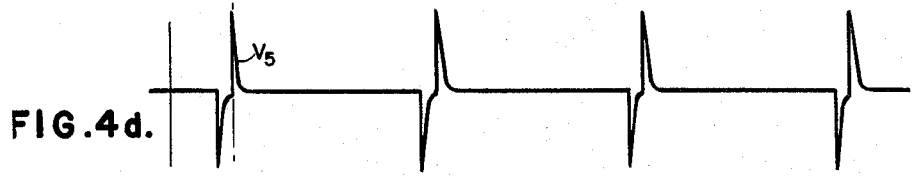
Figure 4E:
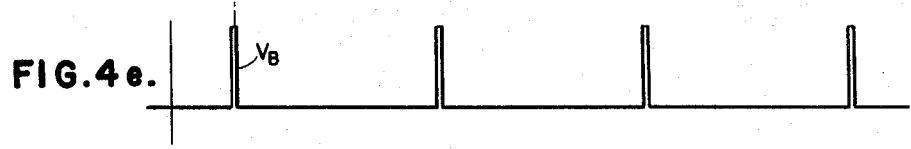

10. The trigger circuit 8 is essentially similar to the trigger circuit 6, so that a repetition of a description of the structure and operation is believed to be unnecessary. The trigger circuit 8 has applied to it the rotary indicator supply voltage $V_S$, and there will appear at the output of the trigger circuit 8 the pulses $V_4$ as shown in FIGURE 4c. The width of these pulses will depend on the hysteresis of the trigger circuit 8.

The differentiating element 9, which has applied to it the pulses $V_4$ and which puts out the pulses $V_5$, is similar in construction and operation to the differentiating element 7. The pulses $V_5$ are very pointed. However, due to the asymptotic approximation of the voltage to the null value, the length of the pulses is not precisely defined, so that the pulses as such are not suitable for controlling the phase-responsive circuit 5 directly. Therefore, there is provided the monostable flip-flop 10, which has applied to it the pulses $V_5$ and which comprises two transistors 44 and 45 whose emitters are connected to each other the junction of these emitters being connected to the negative terminal of the mentioned second D.C. voltage source via the parallel circuit constituted by a resistor 46 and a capacitor 47. The collector of transistor 44 is connected, via a capacitor 48, to the base of transistor 45, this base being connected, via a resistor 49, to the positive terminal of the first D.C. voltage source. The collector of transistor 45 is connected to the positive terminal of the first D.C. voltage source via a further resistor 50, and the collector of the transistor 44 is connected to the same positive terminal via a still further resistor 51. A resistor 52 is connected across the collector of transistor 45 and the base of resistor 44. The base of transistor 44, which serves as the input of the flip-flop, is connected to the negative terminal of the second D.C. voltage source via another resistor 53.

The flip-flop circuit 10 operates as follows:

Of the two transistors 44 and 45, one is always non-conductive and the other conductive. While the flip-flop is in its stable state, current flows through transistor 45, because its base is connected to a positive potential via the resistor 49. Practically the entire battery voltage appears across resistor 50, i.e., practically the entire negative potential is applied to the base of transistor 44. Transistor 44 is non-conductive. If, now, a positive pulse is applied to the input of the monostable flip-flop 10, current will flow for a short period via the base-emitter path of transistor 44. The resulting collector current produces a voltage drop across resistor 51. The change of potential of short duration is applied, via capacitor 48, to the base of the transistor 45. The latter thus has a negative potential applied to it and the collector current drops. As a result, the voltage drop across resistor 50 becomes small and a positive potential is applied, via resistor 52, to the base of transistor 44, so that the latter now becomes conductive. The capacitor 48 now has applied to it a potential of the oppositie polarity, i.e., the capacitor 48 is charged up via resistor 49 in the opposite direction. Shortly after the voltage across the capacitor has passed through zero, which occurs when the potential of that plate of the capacitor which is connected with the base of the transistor 45 becomes slightly positive, the multivibrator flips back into its stable state. Due to the small positive voltage at the base of transistor 45, current will once again flow via the resistor 50. The transistor 44, then, has a negative potential applied to it via the resistor 52, so that the transistor 44 becomes non-conductive. The flip-flop stays in its unstable, or so-called labile, state until the capacitor 48 has been discharged via the resistor 49.

Thus, there will appear at the output of the monostable flip-flop 10 rectangular pulses of a given polarity and of a precisely defined duration, this being so because the pulse width of the pulses put out by the flip-flop will depend only on the capacitance of the capacitor 48 and resistance of the resistor 49. The pulse width may, for example, be about 6 microseconds. These pulses are the ones identified as $V_B$, namely, they are the reference pulses which are applied to the primary winding of the transformer 27 of the phase-responsive circuit 5, thereby to control the same.

The starting pulse $V_A$ is produced as follows:

The motor 4 is mechanically coupled with a disc 54 which carries a narrow, strip-shaped and radially positioned mirror 55. The disc is illuminated by a suitable light source (not shown). Arranged next to the disc is a photosensitive element such as a phototransistor 56, with the transistor 56 and the light source being so oriented with respect to the disc that a light beam will strike the transistor 56 whenever the mirror 55 moves past the transistor. In other words, the transistor 56 will receive one light pulse for every revolution of the disc 54. The operating potential is applied to the base of the transistor 56 by means of a voltage divider constituted by two resistors 57, 58, which are connected in series across the positive and negative potentials. The collector of the transistor 56 is connected to the positive terminal of the first D.C. source via a resistor 59.

Whenever the transistor 56 is illuminated, there will appear a pulse at the collector of the transistor 56. These pulses, whose width is determined by the duration of the time interval throughout which the transistor 56 is illuminated, constitute the above-described starting pulses $V_A$.

The accuracy with which the angle is measured is dependent, mainly, on the level of the thresholds of the trigger circuit 6 and by the ratio of the driving frequency, i.e., the rotational speed of the drive, to the frequency of the voltage supply $V_S$. The greater the frequency of $V_S$ with respect to the driving frequency, and the lower the threshold, the greater will be the accuracy of the system.

The end pulse will always appear after the phase shift. If, for instance, the trigger circuit is so adjusted that the pulse appears, at the latest, within two periods of the supply voltage $V_S$ following the phase shift, and if the frequency $f_S$ of the supply voltage $V_S$ is made equal to 4 kilocycles and the driving speed $n=1$ revolution per second, the maximum possible error F may be calculated as follows:

$$F = 360°.2.n/f_S = 0.18° \approx 0.2°$$

If the starting pulses are shifted by 0.1°, the maximum error, insofar as it is attributable to the effects discussed above, will be ±0.1°.

The individual components may be modified in certain respects without materially affecting the concept underlying the present invention. For example, the two transistors 23 and 24 may be replaced by the recently developed double-transistor, which is a four-terminal semiconductor element having two emitter electrodes, one collector electrode and one base electrode. Such a double-transistor will operate, in principle, as does the circuit described above. At a given polarity of the collector-base path, the path is switched from one emitter to the other without any residual voltage, and will be closed when the opposite potential is applied.

Also, the starting pulses can be produced in ways other than described above. For example, the light beam can be deflected or masked in any one of several suitable ways, or the light-sensitive element can be constituted by other suitable components, such as photo diodes.

Alternatively, the angular position can be determined in any one of several other non-mechanical ways; for instance, a given position of the receiver rotor can be demarcated by means of reactive, i.e., inductive or capacitative, pick-up means. All that is necessary is that the means produce a pulse which precisely marks a given reference position.

The present invention is particularly suited for use in cases where a plurality of different angular positions have to be determined. Such an arrangement is depicted in FIGURE 6 which shows, in block form, three angular position indicators 60, 61, 62, each incorporating its own pair of transmitter and receiver. The respective transmitters have three angles, $\alpha$, $\beta$, $\delta$, respectively, applied to them. Each indicator is fed by the same supply voltage $V_S$, although a single drive motor 4 will suffice to drive the rotors of the three receivers, and a single component 64 will be needed for determining the angular position of the motor and thereby to produce the starting pulses $V_A$. The system further includes three phase-responsive circuits which, together with their respective trigger circuits and differentiating elements corresponding to the components 6 and 7 of FIGURE 5 (and, in practice, the limiter and amplifier component 29), are shown at 65, 66, 67, respectively. However, a single circuit for producing the reference pulses $V_B$—shown, in FIGURE 6, at 63 and incorporating components 8, 9, 10 of FIGURE 5—can be used to service all three of the circuits 65, 66, 67. These three circuits will then put out end pulses $V_{E\alpha}$, $V_{E\beta}$, $V_{E\delta}$, whose timewise spacing from a common starting pulse $V_A$ will be measures of the angles $\alpha$, $\beta$, $\delta$, respectively. Thus, the system as a whole employs a minimum number of individual components, in that the single drive motor 4, as well as one circuit 64 for producing the starting pulses $V_A$ and one circuit 63 for producing the reference pulses $V_B$, can be used in conjunction with a plurality of different angle measuring channels.

It will be seen from the above that, in accordance with the principle underlying the present invention, an angular position is represented by a time interval, which is measured as the time that elapses between a starting pulse and an end pulse. The starting pulses appear at regular intervals, and the length of the intervals depends on the rotational speed of the motor. This time interval, it will be appreciated, is readily susceptible to digital evaluation. In particular, the above-mentioned output means indicated, in FIGURE 2, at P, make it readily possible to provide a digital output, e.g., by starting a counter by means of the starting pulse and stopping it by means of the end pulse, so that the count that is reached will give a digital indication of the angular position being measured. The counter itself has pulses applied to it at a continuous rate, which pulses are counted during the time interval between the starting and end pulses. In practice, the counter will, after its count has been suitably recorded, be reset upon the appearance of the new starting pulse, so that the counter can then begin to count anew.

Figure 7:
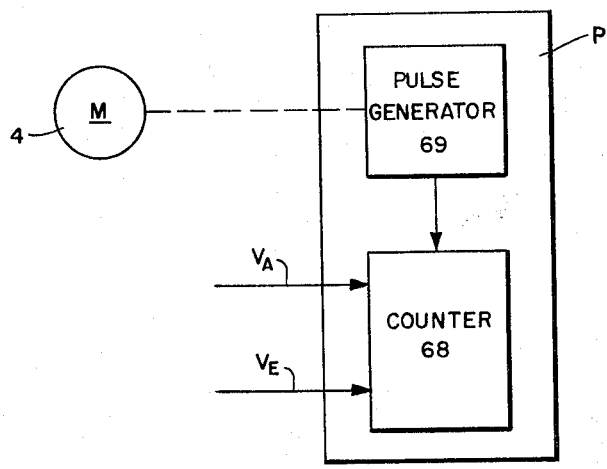
Figure 8:
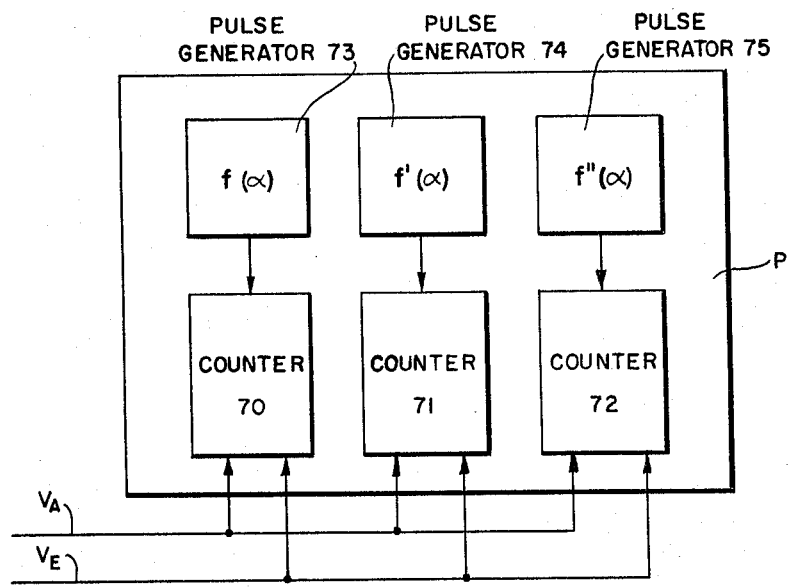
FIGURE 8 is a block diagram of an arrangement in which a number of different functions of the angle can be produced simultaneously.

It will be noted that, if the speed of the driving motor 4 is very constant, an accurate measurement of the angle will be obtained so long as the counter has its counting pulses fed to it at a constant rate. In order to assure even greater accuracy, however, the rate at which the counting pulses are fed to the counter may be made dependent on the speed at which the rotor of the receiver is driven. Such an arrangement is shown in FIGURE 7, which shows a counter 68 as forming part of the circuit P. The counter 68, which itself is turned on and off by the starting and end pulses $V_A$ and $V_E$, respectively, is fed counting pulses from a pulse generator 69 which itself is mechanically coupled with the motor 4 that drives the receiver rotor or rotors. As a result any fluctuations in the rotational speed of the motor will change the rate at which counting pulses are fed to the counter 68. This prevents fluctuations of the motor speed from introducing an error into the angle measurement; the practical significance of this is that the system as a whole can make do with less expensive driving motors which have a greater speed variation tolerance than would be permissible if no counting pulse rate compensation were provided.

According to another feature of the present invention, the counting pulses will intentionally be supplied not at a constant rate but in such a manner that consecutive pulses will be spaced apart by different time intervals. For example, under certain circumstances it is desirable if the counting pulses are distributed along the time axis in accordance with a sine function, so that the count produced by the counter will be a function of the angle $\alpha$, e.g., $\sin \alpha$. This will eliminate one calculating step.

If a number of different functions of the angle are to be produced simultaneously, this can be done by applying the starting and end pulses $V_A$ and $V_E$ to a plurality of counters 70, 71, 72, each of which has counting pulses applied to it from a separate pulse generator 73, 74, 75, which deliver counting pulses at rates that are different functions of $\alpha$, e.g., $f(\alpha)$, $f'(\alpha)$, $f''(\alpha)$, one of which may, as explained above, be a sine function.

It will be understood that the above description of the present invention is susceptible to various modifications, changes, and adaptations, and the same are intended to be comprehended within the meaning and range of equivalents of the appended claims.

What is claimed is:

1. An arrangement for obtaining a digital measurement of an angle, comprising, in combination:
    (a) a rotary angle indicator incorporating a transmitter and a receiver each having a stator and a rotor, said stators being electrically connected to each other and said rotor of said transmitter being adjustable to an angular position to be determined;
    (b) means for applying an alternating voltage to said rotor of said transmitter;
    (c) a drive motor mechanically coupled to said rotor of said receiver for rotating the same, in consequence of which the voltage across said receiver rotor is sinusoidally modulated and undergoes a phase shift when the transmitter and receiver rotors assume the same angular position;
    (d) means mechanically coupled to said receiver rotor for producing a starting pulse when said receiver rotor assumes a given angular reference position;
    (e) phase-responsive means connected to said receiver rotor for producing an end pulse when said receiver rotor voltage undergoes a phase shift; and
    (f) means connected to said means (d) and (e) for determining the duration of the time interval between said starting and end pulses, thereby to obtain a measurement of the angular position of said transmitter rotor which is susceptible to digital evaluation.

2. An arrangement as defined in claim 1 wherein said phase-responsive means include means for deriving from the alternating voltage applied to said rotor of said transmitter a voltage which bears a constant phase relationship to said alternating voltage.

3. An arrangement as defined in claim 1 wherein said phase-responsive means include a phase-responsive circuit having an input connected to receive the output of said receiver rotor, a trigger circuit having an input connected to the output of said phase-responsive circuit, and a differentiating element having an input connected to the output of said trigger circuit, the output of said differentiating element delivering said end pulse.

4. An arrangement as defined in claim 3 wherein said phase-responsive means further include means for deriving from the alternating voltage applied to said transmitter rotor a series of reference pulses which bear a constant phase relationship to said alternating voltage and for applying said reference pulses to said phase-responsive circuit.

5. An arrangement as defined in claim 4 wherein said means for deriving said reference pulses comprise a further trigger circuit having an input connected to said means for applying the alternating voltage to said transmitter rotor, a further differentiating element having an input connected to the output of said further trigger circuit, and a monostable flip-flop having an input connected to the output of said further differentiating element, the output of said flip-flop delivering said reference pulses and being connected to said phase-responsive circuit.

6. An arrangement as defined in claim 5 wherein said phase-responsive circuit comprises first and second transistor circuits having substantially equal collector-emitter cut-off voltages, the emitters of said two transistor circuits being connected directly to each other and the bases of said two transistor circuits being connected to each other via two serially connected resistors, the emitter of one of said transistor circuits being said input of said phase-responsive circuit and the emitter of the other of said transistor circuits being said output of said phase-responsive circuit, there being means for applying said reference pulses across the juncture of said collectors and the juncture of said two serially connected transistors.

7. An arrangement as defined in claim 6 wherein said means for applying said reference pulses across said junctures comprise a transformer having primary and secondary windings, said secondary winding being connected across said two junctures and said reference pulses being applied to said primary winding.

8. An arrangement as defined in claim 6 wherein said two transistor circuits are constituted by two transistors.

9. An arrangement as defined in claim 6 wherein said two transistor circuits are constituted by a four-terminal semiconductor element having two emitter electrodes, one collector electrode and base electrode, said semiconductor element opening the emitter-emitter path upon the application of a voltage of given polarity across the collector-base circuit and closing said emitter-emitter path upon the application of a collector-base voltage of the opposite polarity.

10. An arrangement as defined in claim 1 wherein said phase-responsive means include means for deriving from the alternating voltage applied to said transmitter rotor a series of reference pulses which bear a constant phase relationship with said alternating voltage.

11. An arrangement as defined in claim 10 wherein said reference pulses occur when the quadrature voltage passes through zero.

12. An arrangement as defined in claim 1 wherein said means for producing the starting pulses comprise photosensitive means and rotating means synchronized with said drive motor for periodically changing the illumination of said photosensitive means.

13. An arrangement as defined in claim 1 wherein said means for producing the starting pulses comprise reactive means operatively associated with said rotation of said drive motor for producing a signal whenever a given reference position is occupied.

14. An arrangement as defined in claim 1, further comprising means interposed between said drive motor and said means (f) for rendering the latter responsive to the rotational speed of said drive motor.

15. An arrangement as defined in claim 14 wherein said means (f) include a counter connected to be started by the application of a starting pulse and stopped by the application of an end pulse, and pulse generator for delivering counting pulses to said counter, said pulse generator being connected to said drive motor for delivering counting pulses at a rate dependent on the rotational speed of said drive motor.

16. An arrangement as defined in claim 1 wherein said means (f) comprise a counter connected to be started by the application of a starting pulse and stopped by the application of an end pulse, and a pulse generator for delivering counting pulses to said counter.

17. An arrangement as defined in claim 16 wherein said pulse generator delivers pulses at a substantially constant rate.

18. An arrangement as defined in claim 16 wherein said pulse generator delivers pulses at a non-constant rate.

19. An arrangement as defined in claim 18 wherein said pulse generator delivers pulses at a rate which is a sine function with respect to time.

20. An arrangement as defined in claim 1 wherein said means (f) comprise a plurality of counters each connected to be started by the application of a starting pulse and stopped by the application of an end pulse, and a plurality of pulse generators each connected to a respective one of said counters, each of said pulse generators delivering counting pulses at a different rate.

21. An arrangement as defined in claim 1 wherein there are a plurality of rotary angle indicators each as defined in (a), each transmitter rotor being connected to said means (b) and each receiver rotor being connected to said drive motor (c); a corresponding plurality of phase-responsive means each as defined in (e), each being connected to the receiver rotor of a respective rotary angle indicator; and a corresponding plurality of means (f) each connected to said means (d) and to the respective means (e).

22. An arrangement as defined in claim 21 wherein said plurality of phase-responsive means having in common a single circuit for deriving from the alternating voltage applied to said transmitter rotors a series of reference pulses which bear a constant phase relationship with said alternating voltage.

23. An arrangement for simultaneously obtaining a digital measurement of a plurality of angles, comprising, in combination:
(a) a plurality of rotary angle indicators each incorporating a transmitter and a receiver each having a stator and a rotor, the two stators of each indicator being electrically connected to each other and the rotor of each transmitter being adjustable to a respective angular position to be determined;
(b) means for applying an alternating voltage to the rotors of all of said transmitters;
(c) a drive motor mechanically connected to the rotors of all of said receivers for rotating the same, in consequence of which the voltage across each receiver rotor is sinusoidally modulated and undergoes a phase shift when the transmitter and receiver rotors of the same indicator assume the same angular position;
(d) means mechanically coupled to said receiver rotors for producing a starting pulse when all of said receiver rotors assume a common reference position;
(e) means for deriving from the alternating voltage applied to said transmitter rotors a series of reference pulses which bear a constant phase relationship with said alternating voltage;
(f) a plurality of phase-responsive circuits each connected to a respective receiver rotor as well as to said means (e) for producing an end pulse when the voltage of said respective receiver rotor undergoes a phase shift; and
(g) a plurality of means each connected to a respective phase-responsive circuit and to said means (d) for determining the duration of the time interval between the starting pulse and the end pulse produced by the respective phase-responsive means, thereby to obtain measurements of the angular positions of the respective transmitter rotors which are susceptible to digital evaluation.

References Cited by the Examiner
UNITED STATES PATENTS
3,147,473   9/1964   Ujejski _____ 340—347

OTHER REFERENCES

Notes an Analog to Digital Conversion by A. K. Susskind, 1958, Chapman and Hall, London, pages 6-8 to 6-20.

"Electronic Engineering," June 1958, article by Wood, pages 366-370.

MAYNARD R. WILBUR, *Primary Examiner.*

JOHN F. MILLER, *Examiner.*

W. J. KOPACZ, *Assistant Examiner.*